Sept. 20, 1971           F. M. LATHROP II           3,606,242
GATE VALVE WITH HYDRAULIC OPERATOR
Filed April 8, 1970           2 Sheets-Sheet 2
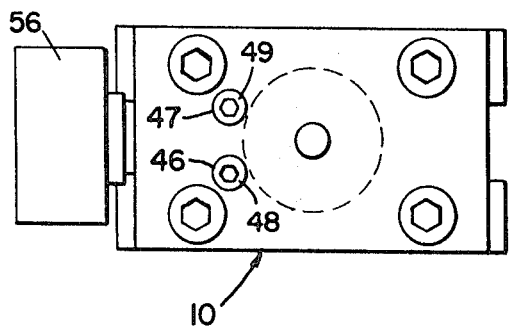
FIG_3
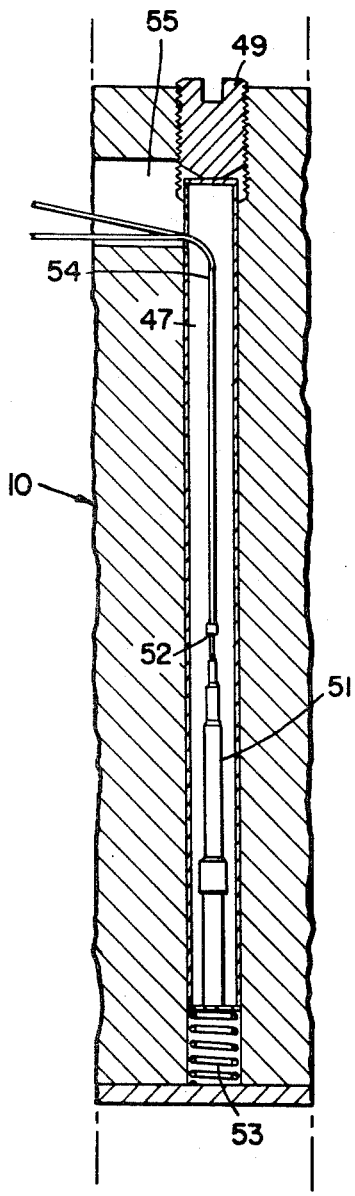
FIG_4
INVENTOR.
FRANCIS M. LATHROP II
BY
ATTORNEYS

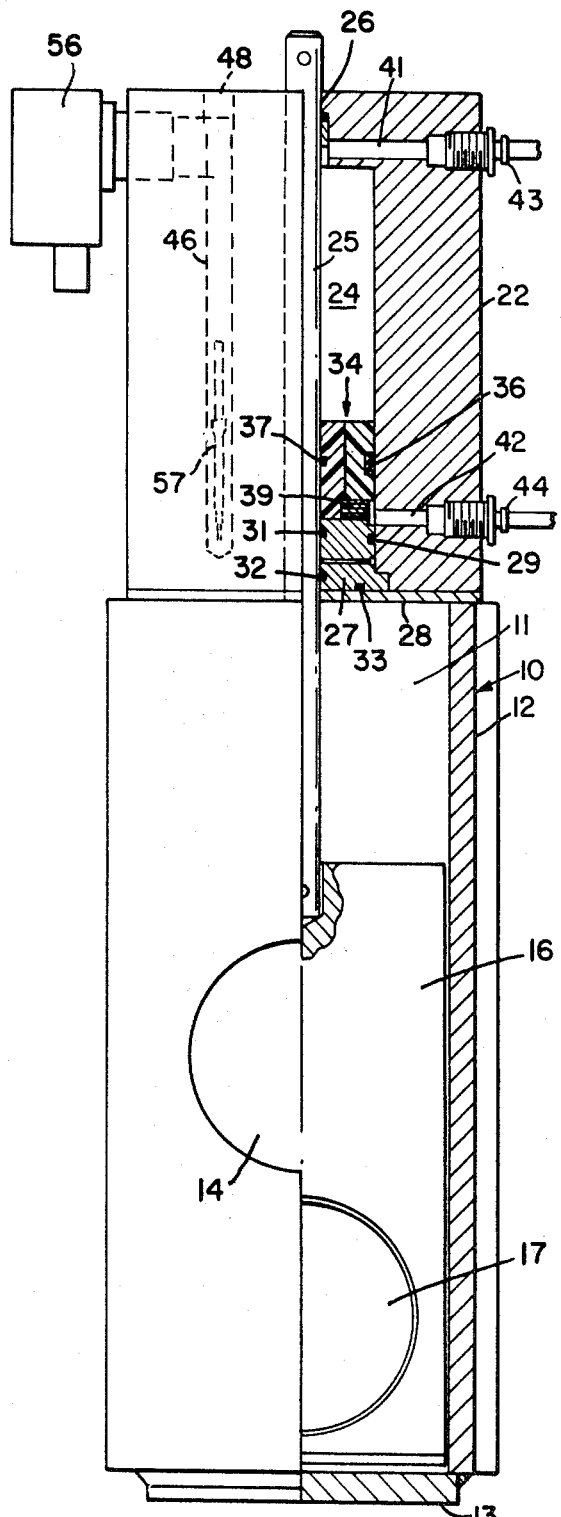
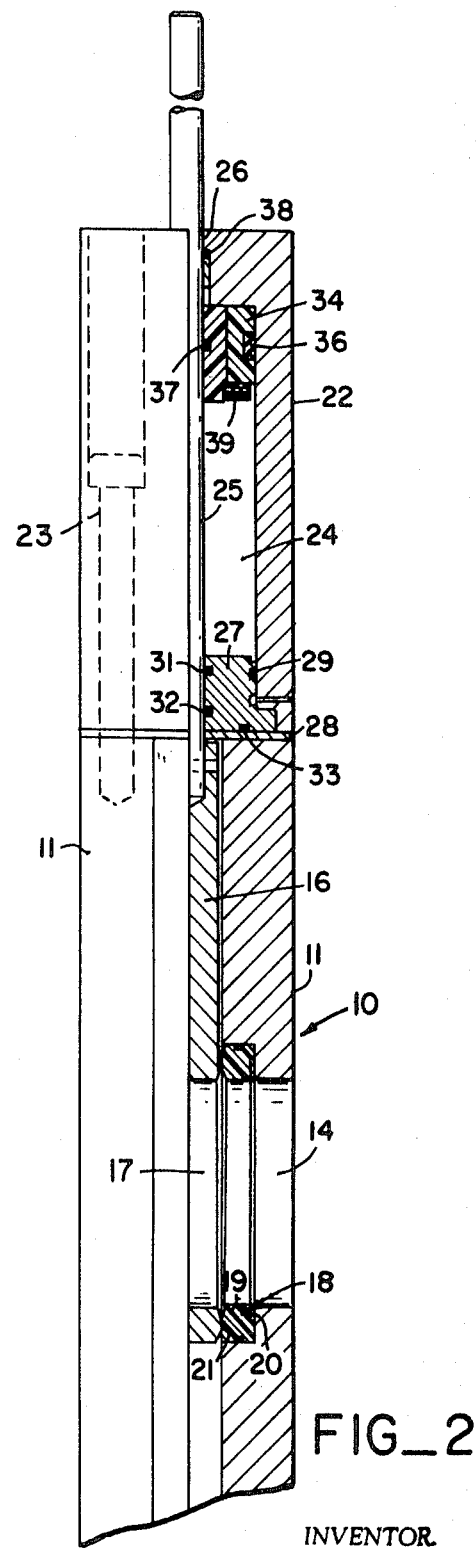

United States Patent Office

3,606,242
Patented Sept. 20, 1971

3,606,242
GATE VALVE WITH HYDRAULIC OPERATOR
Francis M. Lathrop II, Houston, Tex., assignor to
M & J Valve Company, Houston, Tex.
Filed Apr. 8, 1970, Ser. No. 26,614
Int. Cl. F16k *37/00*
U.S. Cl. 251—62                                          3 Claims

ABSTRACT OF THE DISCLOSURE

A gate valve consisting of a body having aligned flow passages and a valve gate within the body which is movable between open and closed positions. A block of nonmagnetic material (e.g., aluminum) is mounted on one end of the body and is provided with a central bore forming a cylinder. One or more additional smaller bores are formed in the block and serve to accommodate magnetically operated electrical switches. A rod connects with the gate and extends axially through the cylindrical bore. A piston is mounted on the rod and is sealed with respect to the surface of the bore. Both end portions of the bore are closed and are adapted to be connected with the hydraulic system for moving the piston in opposite directions whereby the gate is moved between full open and closed positions. A permanent magnet is mounted upon the piston and acts through the adjacent walls of the cylindrical bore to operate the switches.

BACKGROUND OF THE INVENTION

It is common practice to provide power or motor operators for various types of flow control valves. The operator may be electrical, pneumatic or hydraulic. In the past most power operators have been used with valves made in the larger sizes, because such valves cannot be readily and quickly operated by hand. In instances where power means has been used with valves made in the smaller sizes, they have generally been of the electrical solenoid type, or they have employed diaphragms or pistons adapted to be pneumatically operated. In many industrial applications it is desirable to provide small power operated valves in conjunction with larger valves that are hydraulically operated. For such applications it is desirable to provide a compact assembly in the form of a gate valve which can be effectively operated by hydraulic liquid and which will incorporate electrical switches which are opened and closed as the valve is operated and which control associated electrical circuits.

SUMMARY OF THE INVENTION

This invention relates generally to gate valves made in the smaller sizes and provided with means for power operation.

In general, it is an object of the invention to provide a valve of the above type with simple compact hydraulic operating means which is combined with the gate valve as an integral structure.

Another object of the invention is to provide a hydraulically operated valve of the above character having magnetically operated electrical switches and means for their operation.

In general, the present invention consists of a gate valve having a body with aligned flow passages and a gate within the body movable between open and closed positions. Directly mounted upon one end of this body there is a block of nonmagnetic material which forms a closure for the body. This block is provided with a cylindrical bore which is aligned with the gate. A rod is connected to the gate and extends axially within the bore, where it is provided with a hydraulically operated piston. Means is provided for forming a seal between the block and the rod at that end of the bore nearest the body. Additional means is proivded for closing the other end of the bore. At least one, and preferably two, additional bores are formed in the body adjacent the cylindrical bore and parallel thereto. Magnetically operated electrical switches are disposed within the additional bores. Means carried by the piston forms a permanent magnet whereby the magnetic lines of flux serve to operate the magnetically operated switches when the piston is moved in opposite directions by hydraulic liquid.

BRIEF DESCRIPTION OF THE DRAWING

FIG. 1 is an elevational view looking toward one end of the gate valve in half section.

FIG. 2 is an elevational view looking toward one side of the gate valve, likewise in half section.

FIG. 3 is a plan view of the valve as shown in FIGS. 1 and 2.

FIG. 4 is a detail in section showing the mounting of one of the magnetically operated electrical switches.

DESCRIPTION OF THE PREFERRED EMBODIMENT

The apparatus illustrated in the drawing consists of a valve body 10 which may be of fabricated construction, including the flat end walls 11 and side walls 12, which may be connected by welding. One end of this body is closed by plate 13, and the other end is closed by means to be presently described.

The end walls 11 are provided with aligned flow passages 14 adapted to connect with associated piping. Within the body there is a flat gate 16 provided with the valve port 17 and movable between full open and closed positions relative to the flow passages. Suitable sealing assemblies 18 are carried by the end walls 11 and surround the flow passages. The sealing assemblies may be made as disclosed in Pat. No. 3,235,224, and serve to establish seals between the body and the adjacent surfaces of the gate 16. Briefly, they can consist of a nylon ring 19 urged against the gate by a Belleville washer 20 and having an insert 21 of softer resilient material.

A block 22 is mounted upon the upper end of the body and is made of a non-magnetic material such as aluminum or aluminum alloy. The attaching means in this instance consists of screws 23 which extend through the block and are threaded into the upper portions of the end walls 11. The block 22 is provided with a central cylindrical bore 24 which is in alignment with the gate. A rod 25 has its one end connected to the gate 16 and its other end extends to the exterior of the body through the bore 26.

The lower end of the block 22 is sealed with respect to both the rod 25 and the body of the block. Thus a bushing 27 is fitted into the bore and is retained in place by a plate 28 which is interposed between the block and the upper end of the body. Sealing means 29 of the resilient O-ring type establishes a seal between the bushing and the surface of the bore 24. Sealing means 31 and 32 of the resilient O-ring type provide a seal between the bushing and the surface of rod 25. The additional sealing means 33 of the resilient O-ring type provides a seal between the plate 28 and the bushing. The plate 28 may be sealed with respect to the adjacent end surface of the body by suitable gasket means. A piston 34 is fitted within the cylindrical bore 24 and is fixed to the rod 25. The piston is sealed with respect to the surfaces of the bore 24 by the resilient piston ring 36, and it is also sealed with respect to the rod as by means of the resilient O-ring seal 37. The piston is likewise made of non-magnetic material such as a non-magnetic metal or a synthetic material like nylon or Teflon.

Mounted upon the piston there is a permanent magnet 39 which may be in the form of a ring. A suitable magnet is one made up of a plurality of rings in the form of layers or laminations which are stacked one upon the other. Each of the rings is polarized in the direction of its thickness, whereby the stack of rings or laminations provide a magnet polarized in a direction corresponding to the axis of bore 24.

As shown in FIG. 1, ducts 41 and 42 are provided in the block and communicate with the extremities of the bore 24. Suitable pipe fittings 43 and 44 make connections between these ducts and a suitable hydraulic system. When hydraulic liquid under pressure is applied to one duct and liquid exhausted from the other, the piston is moved to move the gate from one operating position to another.

The block 22 is also provided with bores 46 and 47 which are smaller in diameter than bore 23 but which extend parallel to bore 23. These bores are manually closed by the removable plugs 48 and 49. Each of these bores serves to accommodate a magnetically operated electrical switch.

As shown in FIG. 4, the switch 51 within the bore 47 is of the reed type and is encased within the tubular shell 52. The lower end of this shell may engage the compression spring 53. The shell together with the switch 51 can be withdrawn after removing the plug 49. Wires 54 extending from the contacts of the switch lead through port 55 to a terminal box 56 carried on one side of the block.

The other bore 46 illustrated in dotted lines in FIG. 1 similarly accommodates a magnetically operated reed switch 57. Here again the switch may be enclosed within a tube which in turn is inserted in the bore 46. Wires (not shown) connected to the contacts of this switch likewise lead through the port 55 to the terminal box 56.

The non-magnetic walls separating the cylindrical bore 24 from the bores 46 and 47 are relatively thin as is evident from FIG. 3, and therefore the magnetic flux field from the permanent magnet 39 is of sufficient intensity within the bores 46 and 47 for adequate operation of the reed switches.

In actual practice, the two reed switches connect with electrical circuits whereby these circuits are opened or closed depending upon the position of the piston 27. For example, the arrangement can be such that when the piston is in its lowermost position corresponding to fully closed position of the gate, the contacts of the reed switch 51 are magnetically operated. Likewise, when the piston is in its uppermost position corresponding to full open position of the gate valve, the contacts of the reed switch 57 may be operated. The circuitry connected to the contacts may therefore be used for the purpose of indicating whether or not the gate valve is open or closed, or to provide indications showing that the valve has been properly operated in response to application of hydraulic liquid. Also such circuits can be used for controlling related equipment. In some instances the two switches can be used as limiting switches to control a motor reversing switch, where a motor is used to operate the pump that supplies hydraulic liquid under pressure.

In general, the present invention has a number of inherent advantages. When assembled, it is an integral structure with the block 22 forming a bonnet closure for one end of the gate valve body. A single block of non-magnetic material serves to provide the hydraulic operating cylinder, and at the same time it also serves to accommodate the magnetically operated reed switches.

I claim:

1. In a gate valve adapted to be power operated, a body having flow passages for making connection with associated piping, a gate disposed within the body and movable between open and closed positions relative to the flow passages, a block of non-magnetic material secured to one end of the body, said block forming a bonnet closure for the body, a cylindrical bore formed in the body and aligned with the gate, a rod connected to the gate and extending axially into the bore, a piston mounted on the rod and sealed with respect to the rod and the surface of the bore, means forming a seal between the block and the rod at that end of the bore nearest to the body, means forming a closure for the other end of the bore, at least one additional bore in the block extending parallel to the cylindrical bore and adjacent to the same, magnetically operated electrical switching means removably disposed within the additional bore, means forming a permanent magnet carried by the piston and serving to operate the switch when the piston is moved to move the gate between open and closed positions, and means providing hydraulic connections to the end portions of the cylindrical bore to effect reciprocation of the piston.

2. Apparatus as in claim 1 in which the block is provided with two additional bores, both extending parallel to the cylindrical bore, and in which magnetically operated electrical switches are disposed within each of said bores.

3. Apparatus as in claim 1 in which the sealing means between the block and the rod at that end of the cylindrical bore near the body consists of a bushing fitted into the bore, means forming seals between the bushing and the block and between the bushing and the rod, and a plate interposed between the block and the adjacent end of the body, said plate serving to retain said bushing within the bore.

References Cited
UNITED STATES PATENTS

| 2,231,158 | 2/1941 | Davis | 251—65X |
| 3,035,524 | 5/1962 | Kastner | 91—275X |
| 3,364,361 | 1/1968 | Burger | 91—275X |

FOREIGN PATENTS

| 1,546,701 | 10/1968 | France | 251—65 |

ARNOLD ROSENTHAL, Primary Examiner

U.S. Cl. X.R.

137—554; 251—65; 91—Dig. 4, 275